(12) United States Patent
Yoshimura et al.

(10) Patent No.: US 12,014,884 B2
(45) Date of Patent: Jun. 18, 2024

(54) ELECTRODE FOIL FOR ELECTROLYTIC CAPACITOR, ELECTROLYTIC CAPACITOR, AND METHODS FOR MANUFACTURING SAME

(71) Applicant: Panasonic Intellectual Property Management Co., Ltd., Osaka (JP)

(72) Inventors: Mitsuhisa Yoshimura, Osaka (JP); Tatsuji Aoyama, Kyoto (JP); Naomi Kurihara, Osaka (JP); Miwa Ogawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 950 days.

(21) Appl. No.: 16/984,800

(22) Filed: Aug. 4, 2020

(65) Prior Publication Data

US 2020/0373090 A1  Nov. 26, 2020

Related U.S. Application Data

(63) Continuation of application No. PCT/JP2019/006441, filed on Feb. 21, 2019.

(30) Foreign Application Priority Data

Feb. 28, 2018  (JP) ................................ 2018-035678

(51) Int. Cl.
*H01G 9/048* (2006.01)
*H01G 9/00* (2006.01)
(Continued)

(52) U.S. Cl.
CPC ........... *H01G 9/048* (2013.01); *H01G 9/0032* (2013.01); *H01G 9/02* (2013.01); *H01G 9/07* (2013.01)

(58) Field of Classification Search
CPC ........ H01G 9/048; H01G 9/0032; H01G 9/02; H01G 9/07
See application file for complete search history.

(56) References Cited

U.S. PATENT DOCUMENTS

| | | | |
|---|---|---|---|
| 2009/0122460 A1* | 5/2009 | Gschwandtner | ........ H01L 28/84 361/524 |
| 2012/0250227 A1* | 10/2012 | Mitsuyama | .............. H01G 9/07 29/25.03 |

(Continued)

FOREIGN PATENT DOCUMENTS

| | | |
|---|---|---|
| JP | 2003-257796 | 9/2003 |
| JP | 2008-045190 | 2/2008 |

(Continued)

OTHER PUBLICATIONS

International Search Report of PCT application No. PCT/JP2019/006441 dated May 21, 2019.

*Primary Examiner* — Stewart A Fraser
(74) *Attorney, Agent, or Firm* — Rimon P.C.

(57) ABSTRACT

An electrode foil for an electrolytic capacitor includes an anode electrode body including a base material part having a porous body portion, and a dielectric layer disposed on a surface of the porous body portion. The anode electrode body has a first main surface in which pores of the porous body portion are opened, a second main surface opposite to the first main surface, and an end surface connecting the first main surface and the second main surface. In the porous body portion, a first film thickness of the dielectric layer in an end surface vicinity region is larger than a second film thickness of the dielectric layer in a deep inner region, the end surface vicinity region being a region within a predetermined distance from the end surface, the deep inner (Continued)

region being a region located away from the first main surface and at a central portion in a direction parallel to the first main surface.

12 Claims, 8 Drawing Sheets

(51) Int. Cl.
  *H01G 9/02* (2006.01)
  *H01G 9/07* (2006.01)

(56) References Cited

U.S. PATENT DOCUMENTS

| | | | |
|---|---|---|---|
| 2014/0313638 A1* | 10/2014 | Kato | H01G 9/0032 |
| | | | 29/25.03 |
| 2018/0158610 A1* | 6/2018 | Inoue | H01G 4/33 |
| 2018/0358181 A1 | 12/2018 | Ogawa et al. | |
| 2019/0006112 A1 | 1/2019 | Aoyama et al. | |
| 2020/0006011 A1 | 1/2020 | Ogawa et al. | |

FOREIGN PATENT DOCUMENTS

| | | |
|---|---|---|
| JP | 2017-175082 | 9/2017 |
| JP | 2017-175091 | 9/2017 |
| WO | 2013/046869 A1 | 4/2013 |
| WO | 2017/154461 | 9/2017 |
| WO | 2017/163725 A1 | 9/2017 |
| WO | 2018/180029 | 10/2018 |

\* cited by examiner

ELECTRODE FOIL FOR ELECTROLYTIC CAPACITOR, ELECTROLYTIC CAPACITOR, AND METHODS FOR MANUFACTURING SAME

RELATED APPLICATIONS

This application is a continuation of the PCT International Application No. PCT/JP2019/006441 filed on Feb. 21, 2019, which claims the benefit of foreign priority of Japanese patent application No. 2018-035678 filed on Feb. 28, 2018, the contents all of which are incorporated herein by reference.

BACKGROUND

1. Technical Field

The present disclosure relates primarily to electrodes of electrolytic capacitors.

2. Description of the Related Art

A metal foil containing a valve metal is used for an anode body of the electrolytic capacitor. From the viewpoint of increasing electrostatic capacity, at least a part of a main surface of a metal material is subjected to a treatment such as etching to form a porous body. Then, the porous body is subjected to an anodization treatment to form a metal oxide layer (dielectric layer) on the surface of the pores or irregularities of the porous body.

The characteristics (number of defects, wettability, etc.) of the metal oxide layer formed by the anodization treatment affect the capacity, a withstand voltage, and a leak current of the electrolytic capacitor after manufacturing.

For example, Unexamined Japanese Patent Publication No. 2003-257796, in order to increase the electrostatic capacity, proposes to form a composite oxide film, which is a mixed layer of aluminum oxide and a valve metal oxide (other than aluminum oxide), as a dielectric layer by using a valve metal oxide precursor solution.

SUMMARY

An electrode foil for an electrolytic capacitor according to a first aspect of the present disclosure (hereinafter, appropriately referred to as "first aspect") includes an anode electrode body including a base material part having a porous body portion, and a dielectric layer disposed on a surface of the porous body portion. The anode electrode body has a first main surface in which pores of the porous body portion are opened, a second main surface opposite to the first main surface, and an end surface connecting the first main surface and the second main surface. In the porous body portion, a first film thickness of the dielectric layer in an end surface vicinity region is larger than a second film thickness of the dielectric layer in a deep inner region. Here, the end surface vicinity region is a region within a predetermined distance from the end surface. The deep inner region is a region located away from the first main surface and at a central portion in a direction parallel to the first main surface.

The electrode foil for an electrolytic capacitor according to a second aspect of the present disclosure (hereinafter, appropriately referred to as "second aspect") includes an anode electrode body including a base material part having a porous body portion, and a dielectric layer disposed on a surface of the porous body portion. The anode electrode body has a first main surface in which pores of the porous body portion are opened, a second main surface opposite to the first main surface, and an end surface connecting the first main surface and the second main surface. The dielectric layer includes a first dielectric layer and a second dielectric layer. The first dielectric layer is in contact with the surface of the porous body portion, and the second dielectric layer is disposed on the end surface and on the first dielectric layer. In the porous body portion, a first film thickness of the second dielectric layer in the end surface vicinity region is larger than a second film thickness of the second dielectric layer in a deep inner region. Here, the end surface vicinity region is a region within a predetermined distance from the end surface. The deep inner region is a region located away from the first main surface and at a central portion in a direction parallel to the first main surface.

The electrolytic capacitor according to a third aspect of the present disclosure (hereinafter, appropriately referred to as "third aspect") has an anode body using the electrode foil of the first aspect or the second aspect.

The electrolytic capacitor according to a fourth aspect of the present disclosure (hereinafter, appropriately referred to as "fourth aspect") includes a laminated body. The laminated body includes an anode body using the electrode foil of the first aspect, a separator, and a cathode body. The anode body, the separator, and the cathode body are laminated in this order. The end portion of the separator is covered with an insulating layer.

A method for manufacturing an electrode foil for an electrolytic capacitor according to a fifth aspect of the present disclosure includes the following steps: (a-i) a step of preparing a roughened foil including a base material part having a porous body portion, (a-ii) a step of forming a first dielectric layer on the base material part, (a-iii) after the step of preparing the roughened foil, a roughened foil cutting step of cutting the roughened foil at a predetermined position to form an anode base material with the base material part exposed at the cutting surface, and (a-iv) after the roughened foil cutting step, a step of forming a second dielectric layer on the cutting surface by an atomic layer deposition method.

A method of manufacturing an electrolytic capacitor according to a sixth aspect of the present disclosure includes the following steps: (b-i) a step of preparing a roughened foil including a base material part having a porous body portion, (b-ii) a step of forming a first dielectric layer on the base material part, (b-iii) after the step of preparing the roughened foil, a roughened foil cutting step of cutting the roughened foil at a predetermined position to form an anode base material with the base material part exposed at the cutting surface, (b-iv) a step of forming a capacitor element including an anode body by separating the anode body from the anode base material, and (b-v) after the roughened foil cutting step, a step of forming a second dielectric layer on the cutting surface by an atomic layer deposition method.

According to the present disclosure, it is possible to form an oxide film with few defects even on the cutting surface of the electrode foil. As a result, the withstand voltage of the electrolytic capacitor can be improved and the leak current can be reduced.

DETAILED DESCRIPTION OF EMBODIMENT

Figure 1:
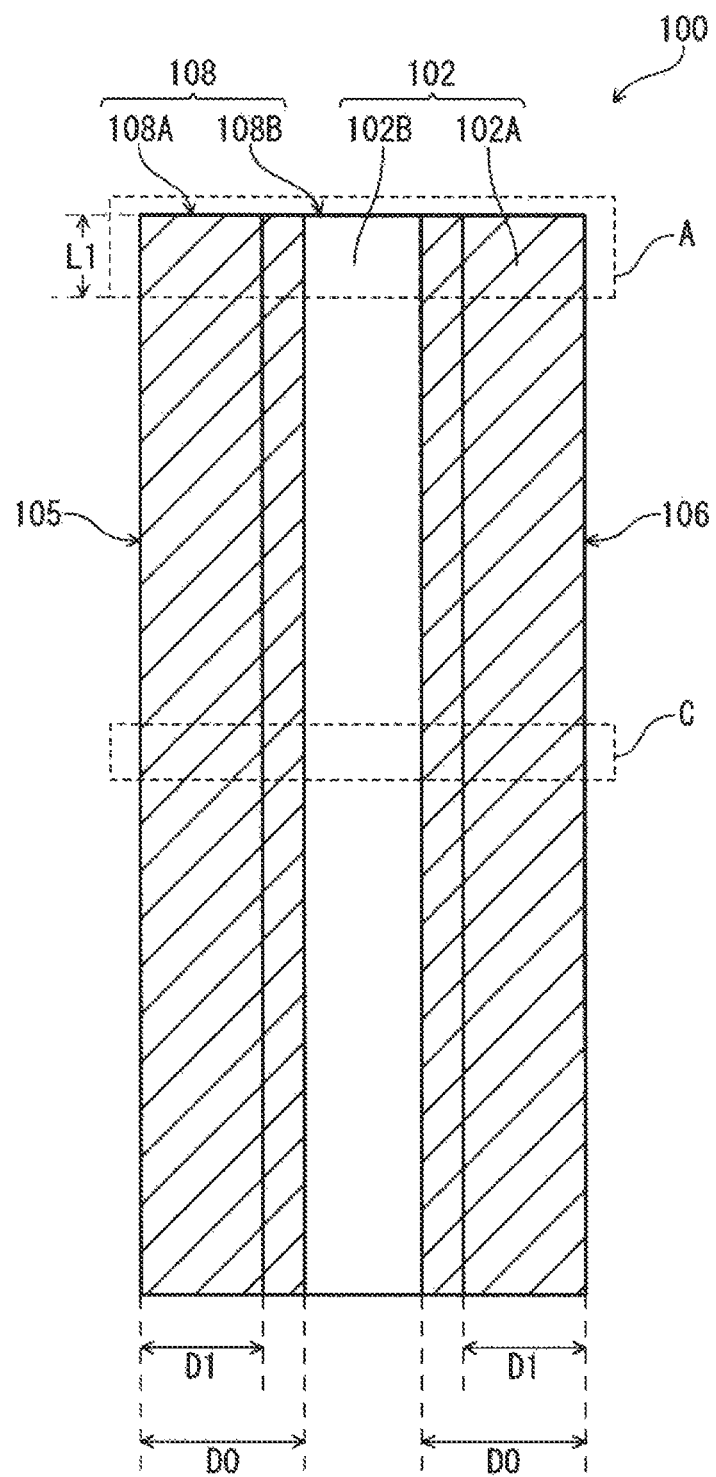
FIG. 1 is a schematic cross-sectional view illustrating an example of an electrode foil for an electrolytic capacitor according to a first exemplary embodiment of the present disclosure.

Prior to the description of the exemplary embodiments, problems in the related art will be briefly described.

In the production of electrolytic capacitors, generally, a large-sized metal foil is etched and subjected to an anodizing treatment, and then the anode foil after the anodizing treatment is cut into a predetermined shape and size. Then, the laminated body of the anode body, the separator, and the cathode body is housed in a case to assemble the electrolytic capacitor. Thus, the cutting surface of the anode foil (the metal layer) may not be covered with the metal oxide layer and may be exposed from the metal oxide layer. When the metal layer is exposed, a leak current flows through the exposed metal layer, which is one of the causes of lowering the withstand voltage.

Hence, in order to suppress a leak current from flowing through the exposed metal layer, another anodizing treatment or an aging treatment is performed after the assembly step or after the assembly, and an oxide film is also formed on the cutting portion.

However, the oxide film formed on the cutting portion may have many defects because it undergoes a process different from the anodization of the metal foil. As a result, the effect of suppressing the decrease in withstand voltage and the increase in leak current through the cutting portion was insufficient.

The electrode foil for an electrolytic capacitor according to a first exemplary embodiment of the present disclosure includes an anode electrode body including a base material part having a porous body portion, and a dielectric layer disposed on the surface of the porous body portion. The anode electrode body has a first main surface in which pores of the porous body portion are opened, a second main surface opposite to the first main surface, and an end surface connecting the first main surface and the second main surface. In the porous body portion, a first film thickness of the dielectric layer in the end surface vicinity region is larger than a second film thickness of the dielectric layer in a deep inner region. Here, the end surface vicinity region is a region within a predetermined distance from the end surface. The deep inner region is a region located away from the first main surface and at a central portion in a direction parallel to the first main surface.

The porous body portion can be obtained, for example, by roughening a part of a metal foil made of a valve metal by etching or the like. In the base material part of the anode foil, which remains after etching, the inner portion becomes a core material portion and the outer portion made porous by etching becomes the porous body portion. A metal oxide layer is formed on the surface of the porous body portion by anodization. The metal oxide layer constitutes at least a part of the dielectric layer. A first main surface and/or a second main surface of the anode foil constitutes an outer surface of the porous body portion.

The dielectric layer may be constituted by a laminate of a plurality of metal oxide layers (first to fourth dielectric layers described later). In the following, the term "film thickness of the dielectric layer" basically means the total film thickness of the laminated metal oxide layers. Meanwhile, when referring to the film thickness of each metal oxide layer, for example, the film thickness of the first dielectric layer, the "film thickness of the first dielectric layer" is used.

In the electrode foil for an electrolytic capacitor according to the above-described exemplary embodiment, the dielectric layer is also formed on the end surface that connects the first main surface and the second main surface of the electrode foil. The film thickness of the dielectric layer satisfies the condition that film thickness TA of the dielectric layer in the end surface vicinity region is larger than film thickness T0 of the dielectric layer in the deep inner region of the porous body portion, which is located in the central portion of the first main surface.

Here, the end surface vicinity region is a region which includes a part of the porous body portion and has a depth of a predetermined distance or less from the end surface (that is, the minimum distance from the end surface). The predetermined distance is, for example, approximately 1 µm. That is, the end surface vicinity region includes, for example, a region having a distance of 1 µm from the end surface.

The distribution of the film thickness of the dielectric layer as described above is obtained by cutting the electrode foil after anodization and then forming another dielectric layer on the cutting surface (end surface) of the electrode foil using a vapor phase method such as an atomic layer deposition (ALD) method. In the present exemplary embodiment, the metal oxide layer (anodization layer) formed in the porous body portion by anodization is further covered with another dielectric layer in the end surface vicinity region. In the following, the dielectric layer formed in this way and different from the anodization layer is referred to as a coating layer.

In the vapor phase growth method, the precursor material for forming the coating layer can reach the inner region to some extent from the outer surface of the porous body portion through the pores of the porous body portion. However, the farther from the outer surface of the porous body portion, the more difficult the precursor material reaches. Hence, in the porous body portion, the film thickness of the coating layer has a distribution in which the film thickness is large near the outer surface of the electrode foil (the porous body portion) and becomes smaller as the distance from the outer surface increases. The film thickness of the coating layer at any position in the porous body portion depends on the length of the shortest path reaching to the outer surface through the pores of the porous body portion, and does not necessarily depend on the shortest distance to the outer surface. However, in general, the film thickness of the coating layer depends on the distance from the outer surface of the porous body portion.

In the present exemplary embodiment, for example, after cutting the electrode foil after anodization, when forming a coating layer in the end surface vicinity region, the film thickness of the coating layer in the porous body portion becomes large near the cutting surface (end surface) of the electrode foil. On the other hand, in the central part of the first main surface, the coating layer is not substantially formed in the deep inner region of the porous body portion, which is away from the first main surface in the thickness direction (the normal direction of the first main surface) because the deep inner region is sufficiently away from the cutting surface of the electrode foil and is sufficiently away also from the first main surface. Thus, film thickness T0 of the dielectric layer in the deep inner region is approximately equal to the film thickness of the metal oxide layer (anodization layer) formed by anodization. On the other hand, in the end surface vicinity region, film thickness TA of the dielectric layer is a total film thickness of the film thickness of the metal oxide layer (anodization layer) formed by anodization and the film thickness of the coating layer. When the coating layer is formed after the anodization, since the film thickness of the anodization layer is substantially uniform regardless of a distance in the thickness direction of the porous body portion, film thickness TA of the dielectric layer is larger than film thickness T0 by the film thickness of the coating layer. The film thickness of the coating layer (and the film thickness of the dielectric layer) has a distribution that it becomes smaller as the distance from the end surface increases, at least in a region that is deep in the thickness direction of the porous body portion and in the vicinity of the cutting surface (end surface).

The deep inner region of the porous body portion is a region which is deep in the thickness direction of the porous body portion to the extent that the coating layer could not be substantially formed, as long as it is sufficiently away from the end surface. And it means a region away from the first main surface, for example, by 2 μm or more toward the inside of the anode electrode body (porous body portion).

Using the vapor phase growth method, the surface of the porous body portion can be covered with a dense dielectric layer with few defects over a region within at least 1 μm from the end surface. Since the dense coating layer with few defects is formed on the end surface and in the end surface vicinity region of the porous body portion, the withstand voltage can be increased and the leak current through the end surface can be reduced. In addition, the mechanical strength of the electrode foil can be increased. Among the vapor phase growth methods, the ALD method is preferable because it makes easy to form such a coating layer.

Preferably, the coating layer is formed from the exposed end surface of the porous body portion to a depth of at least 5 times the size of the pits or pores of the porous body portion. For example, if the pit diameter (modal diameter) is 200 nm, it is preferable to form a coating layer in a region within approximately 1 μm from the end surface in the end surface vicinity region of the porous body portion.

Preferably, film thickness TA of the dielectric layer, which is formed so as to cover and being disposed along a surface of the pores of the porous body portion, has a distribution that it becomes smaller as the distance from the end surface increases. By forming the thick dielectric layer near the end surface, the withstand voltage of the electrolytic capacitor can be increased and the leak current can be reduced.

Preferably, the base material part includes a core material portion that is disposed consecutively with the porous body portion and is not porous. And the dielectric layer is formed also on the end surface of the core material portion. It is preferable that film thickness TB of the dielectric layer at the end surface of the core material portion is configured to be larger than film thickness T0 of the anodization layer (film thickness of the metal oxide layer formed by anodization). Further, it is preferable that the dielectric layer is formed also on the end surface of the porous body portion, and the film thickness of the dielectric layer at the end surface of the porous body portion is configured to be larger than film thickness T0 of the anodization layer.

When the electrode foil after anodization is cut, a natural oxide film may be formed on the cutting surface (end surface) of the base material part (core material portion and porous body portion) where the metal is exposed. Thus, the natural oxide film may be interposed between the base material part and the coating layer at the end surface.

Further, in some cases, after assembling of the electrolytic capacitor, an end surface anodization step may be performed. In end surface anodization step, an oxide film is formed on an end surface where the metal of the core material portion and the porous body portion is exposed. When the end surface anodization step is performed, an end surface anodization layer (corresponding to a third dielectric layer described later) may be interposed between the base material part and the coating layer on the end surface.

In general, the end surface anodization step is performed at a voltage lower than that in the anodization step of forming the metal oxide layer on the surface of the pores of the porous body portion, so that the film thickness of the oxide film formed on the end surface is smaller than film thickness T0. Further, in the end surface anodization step performed at a voltage lower than that in the anodization step, since the metal oxide layer (anodization layer) formed on the surface of the porous body portion does not grow thicker, film thickness T0 does not change before and after the end surface anodization.

On the other hand, film thickness TB of the dielectric layer at the end surface of the core material portion is the total film thickness of the film thickness of the coating layer, the film thickness of the natural oxide film, and the film thickness of the end surface anodization layer (third dielectric layer) formed by the end surface anodization step. When the coating layer is formed after the end surface anodization step, film thickness TB of the dielectric layer at the end surface of the core material portion can be made larger than film thickness T0.

Even when the coating layer is formed before the end surface anodization step, film thickness TB of the dielectric layer at the end surface of the core material portion can be made larger than film thickness T0. That is, by forming the coating layer with a thickness equal to or larger than the film thickness of the end surface anodization layer that can be formed by the end surface anodization voltage, film thickness TB of the dielectric layer at the end surface of the core material portion can be made larger than film thickness T0. In this case, the third dielectric layer is not substantially formed. However, defects in the dielectric layer caused by the formation of the coating layer can be repaired and a denser dielectric layer can be formed.

As a result, the dielectric layer on the end surface can be made thicker and the withstand voltage of the electrolytic capacitor can be increased. In addition, the leak current can be reduced.

Furthermore, an electrode foil for an electrolytic capacitor according to a second exemplary embodiment of the present disclosure includes an anode electrode body including a base material part having a porous body portion, and a dielectric layer disposed on the surface of the porous body portion. The anode electrode body has a first main surface in which pores of the porous body portion are opened, a second main surface opposite to the first main surface, and an end surface connecting the first main surface and the second main surface. The dielectric layer includes a first dielectric layer and a second dielectric layer. The first dielectric layer is in contact with the surface of the porous body portion, and the second dielectric layer is disposed on the end surface and on the first dielectric layer. In the porous body portion, film thickness T2A of the second dielectric layer in an end surface vicinity region is larger than film thickness T20 of the second dielectric layer in the deep inner region. Here, the end surface vicinity region is a region within a predetermined distance from the end surface. The deep inner region is a region located away from the first main surface and at a central portion in a direction parallel to the first main surface.

The first dielectric layer includes a metal oxide layer formed on the surface of the porous body portion by anodization, and is formed along the pores of the porous body portion. On the other hand, the second dielectric layer includes a coating layer. The second dielectric layer covers the cutting surface (end surface) and also covers the first dielectric layer (anodization layer) at least in the end surface vicinity region. At the end surface of the anode electrode body, the second dielectric layer, which covers the core material portion of the base material part, continuously extends beyond the boundary between the core material portion and the porous body portion to cover the first dielectric layer.

As described above, the end surface vicinity region is a region which includes a part of the porous body portion and has a depth of a predetermined distance or less from the end surface (that is, the minimum distance from the end surface). Preferably, the end surface vicinity region includes a region within a distance of 1 μm from the end surface. Further, the deep inner region of the porous body portion is, as described above, a region of a depth in which the coating layer could not be substantially formed in the porous body portion. And it means a region away from the first main surface, for example, by 2 μm or more toward the inside of the anode electrode body.

In the present exemplary embodiment as well, similar to the electrode foil for an electrolytic capacitor according to the first exemplary embodiment, a dense coating layer with few defects is formed in the end surface vicinity region. As a result, the withstand voltage can be increased and the leak current through the end surface can be reduced.

By using the electrode foil for an electrolytic capacitor according to the first or second exemplary embodiment as an anode body, it is possible to achieve an electrolytic capacitor having a high withstand voltage and a reduced leak current.

When the electrolytic capacitor has a laminated body in which an anode body, a separator, and a cathode body are laminated in this order, the end portion of the separator may be covered with a fourth dielectric layer (insulating layer).

The fourth dielectric layer, like the second dielectric layer, can be formed by a vapor phase method.

Since the end portion of the separator is covered with the fourth dielectric layer, the effect of increasing the withstand voltage of the electrolytic capacitor and the effect of reducing the leak current can be further enhanced.

The second or fourth dielectric layer may be formed of the same material as the first and third dielectric layers, or may be formed of a different material. The first and third dielectric layers are metal oxide layers obtained by anodization of a metal foil, and a valve metal such as aluminum, tantalum, niobium or an alloy containing a valve metal can be preferably used.

[Specific Examples of Electrode Foil for Electrolytic Capacitor]

Figure 2:
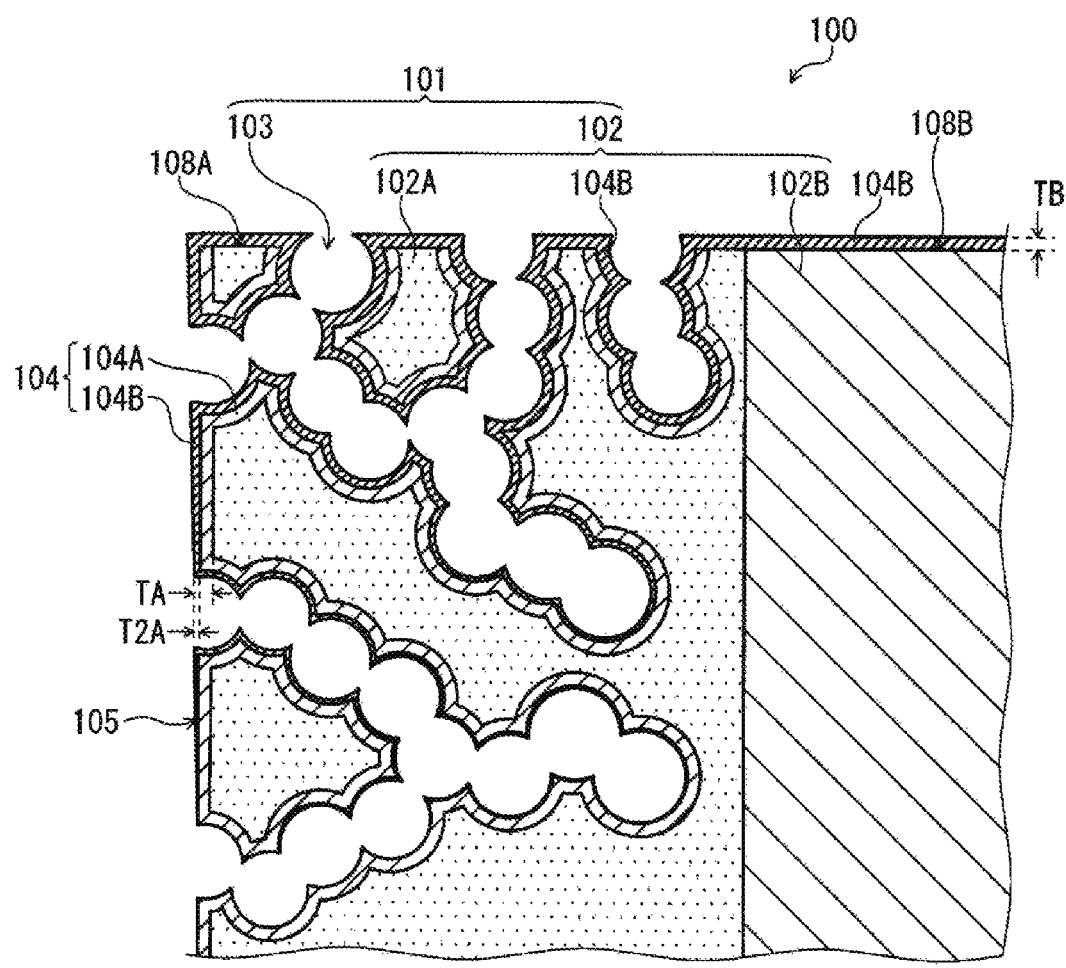
FIG. 2 is an enlarged schematic cross-sectional view illustrating an end surface vicinity region of the electrode foil for the electrolytic capacitor according to the first exemplary embodiment.

FIGS. 1 and 2 are schematic cross-sectional views illustrating an example of the electrode foil for an electrolytic capacitor according to the first exemplary embodiment of the present disclosure. FIG. 1 corresponds to a cross-sectional view in a thickness direction of anode body 21 in FIG. 9 described later. FIG. 2 is an enlarged view illustrating a part of end surface vicinity region A of FIG. 1. In FIG. 2 and FIGS. 3 to 5 to be described later, pores 103 and dielectric layer 104 (104A to 104D) of porous body portion 102A are emphasized and drawn, and a scale of each constituent element in the drawing (in particular, the film thickness of the dielectric layer) does not match the actual scale.

Electrode foil 100 for an electrolytic capacitor (hereinafter, appropriately referred to as "anode foil 100") includes anode electrode body 101 including base material part 102 and dielectric layer 104 (104A, 104B). Base material part 102 includes porous body portion 102A having pores 103 and core material portion 102B made of metal. Dielectric layer 104 (104A, 104B) is formed along pores 103 of porous body portion 102A and covers a surface of porous body portion 102A. Dielectric layer 104B also covers a portion where core material portion 102B and porous body portion 102A are exposed at the end surface.

As shown in FIG. 1, anode foil 100 has first main surface 105, second main surface 106 opposite to first main surface 105, and end surface 108 connecting first main surface 105 and second main surface 106. Pores 103 are opened in first main surface 105 and second main surface 106. Porous body portion 102A is formed both in a region within depth D0 from first main surface 105 and in a region within depth D0 from second main surface 106. End surface 108 has end surface 108A where porous body portion 102A is exposed and end surface 108B where core material portion 102B is exposed.

Thickness D0 of porous body portion 102A in anode foil 100 is, for example, 10 μm or more and 65 μm or less, and the thickness of core material portion 102B is, for example, 10 μm or more and 40 μm or less.

FIG. 2 is a schematic cross-sectional view in which region A and its periphery in the vicinity of end surface 108 at a side close to first main surface 105 of FIG. 1 are enlarged. As shown in FIG. 2, dielectric layer 104 has first dielectric layer (anodization layer) 104A and second dielectric layer (coating layer) 104B. Both first dielectric layer 104A and second dielectric layer 104B are formed along pores 103 and cover the surface of porous body portion 102A.

Second dielectric layer 104B also covers end surfaces 108A and 108B. Second dielectric layer 104B formed on exposed end surface 108B of core material portion 102B continuously extends to cover exposed end surface 108A of porous body portion 102A, and also covers first dielectric layer 104A formed along pores 103 that are opened in end surface 108A.

Although a natural oxide film may be formed on end surfaces 108A and 108B, the description thereof is omitted in FIG. 2. When the natural oxide film is formed, second dielectric layer 104B may be formed on the natural oxide film.

First dielectric layer 104A contains an oxide of a first metal and is usually an oxide film formed by anodizing porous body portion 102A. A valve metal suitable for forming an oxide film is selected as the first metal. Pore 103 is a space surrounded by a skeleton or a wall portion (hereinafter, metal skeleton) made of the first metal. And first dielectric layer 104A is provided so as to cover at least a part of the surface of the metal skeleton. In anode electrode body 101 having a porous body portion, the diameter of pore 103 is extremely narrow. For example, a modal pore diameter of the pore distribution measured by a mercury porosimeter is 50 nm or more and 2000 nm or less. In order to form second dielectric layer 104B to a relatively deep portion of porous body portion 102A having such fine pits P or pores, although not particularly limited, for example, an atomic layer deposition method (ALD method) is suitable.

On the other hand, in the central portion of the first main surface (region C in FIG. 1), since the deep inner region of the anode foil is sufficiently away from both end surface 108 and first main surface 105, second dielectric layer 104B is not substantially formed. Hence, total thickness T0 of dielectric layer 104 in the deep inner region of region C is approximately equal to film thickness T1 of first dielectric layer 104A. The deep inner region is shown in FIG. 1 as a region where the depth from first main surface 105 is D1 or more and less than D0. Depth D1 is, for example, 2 μm or more.

On the other hand, in the region in the vicinity of end surface 108 (region A in FIG. 1), the film thickness of second dielectric layer 104B is formed depending on the distance from end surface 108 (108A). End surface vicinity region A refers to a region in porous body portion 102A whose distance from end surface 108 is L1 or less. L1 is, for example, about 1 μm.

In FIG. 2, film thickness T1 of first dielectric layer 104A formed in porous body portion 102A is uniform regardless of the depth from first main surface 105 and the distance from end surface 108A, and is approximately equal to total thickness T0 of dielectric layer 104 in the deep inner region of region C. On the other hand, film thickness T2A of second dielectric layer 104B formed in porous body portion 102A becomes smaller as the distance from end surface 108 (108A) increases, and has a distribution depending on the distance from end surface 108. Meanwhile, the dependence of film thickness T2A on the distance from first main surface 105 is small.

Hence, total film thickness TA=T1+T2A of dielectric layer 104 in end surface vicinity region A is larger than total thickness T0 of dielectric layer 104 in the deep inner region of region C by film thickness T2A of the second dielectric layer, and becomes smaller as the distance from end surface 108 increases.

The film thickness distribution of dielectric layer 104 (104A, 104B) shown in FIG. 2 can be obtained, for example, by forming a hoop-shaped anode base material by cutting a wide roughened foil wound in a hoop-shape on which only first dielectric layer 104A is formed into a predetermined width, and then covering the cutting surface of the anode base material with second dielectric layer 104B.

As described above, in the example shown in FIG. 2, by covering the exposed portions of core material portion 102B and porous body portion 102A at a side close to end surface 108 with second dielectric layer 104B, a dense dielectric layer, which is thick at the side close to end surface 108, can be formed. As a result, the withstand voltage of the electrolytic capacitor can be increased and the leak current can be reduced.

In the example of FIG. 2, by covering second dielectric layer 104B in a state in which first main surface 105 is covered with a film material such as a separator, penetration of the precursor material via first main surface 105 into pores 103 is suppressed. However, a part of the precursor material can penetrate into the gap between first main surface 105 and the film material. Second dielectric layer 104B that covers first main surface 105 may be formed in a vicinity region of end surface 108A. Further, on first main surface 105, the film thickness of second dielectric layer 104B becomes smaller as the distance from end surface 108A increases.

Figure 3:
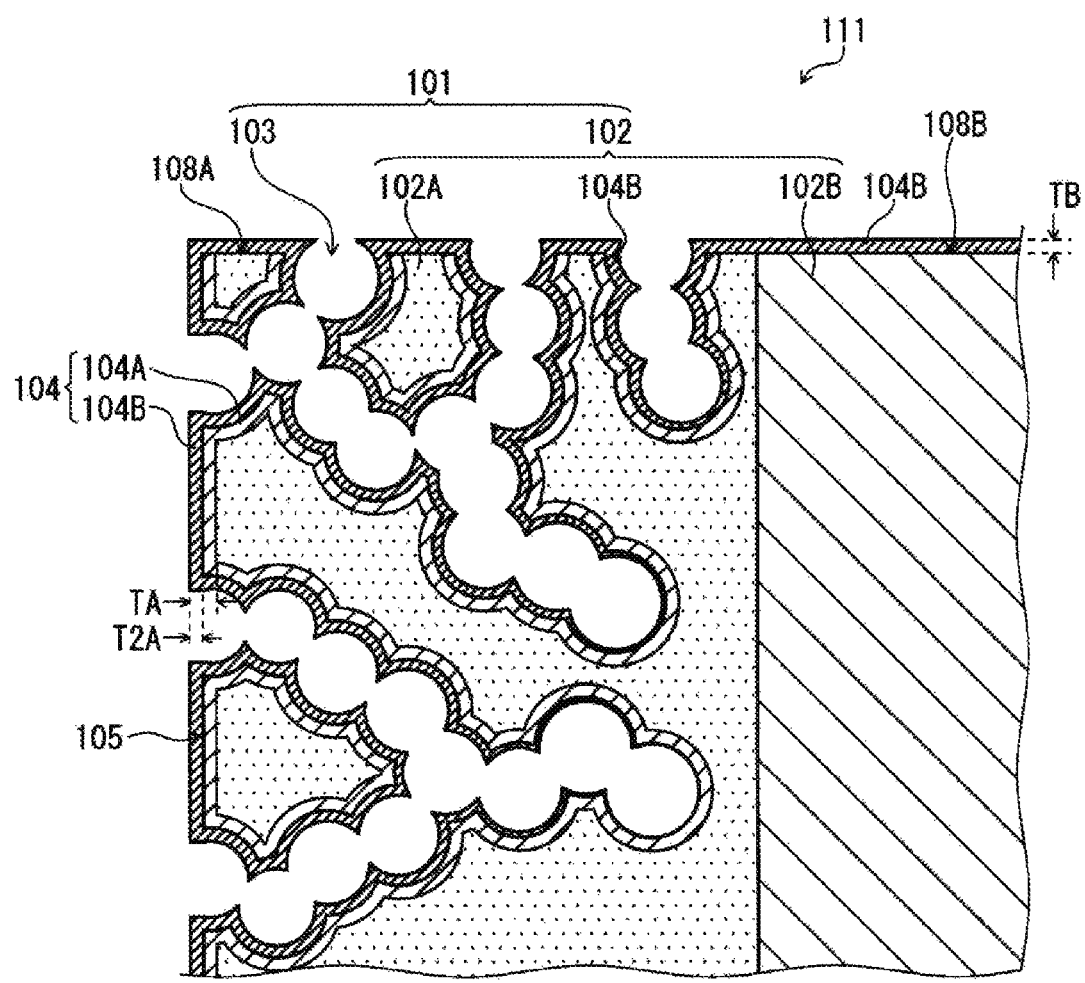
FIG. 3 is an enlarged schematic cross-sectional view illustrating an end surface vicinity region of an electrode foil for an electrolytic capacitor according to a modification of the first exemplary embodiment of the present disclosure.

FIG. 3 shows a modification of the electrode foil for an electrolytic capacitor shown in FIG. 2, and shows a cross-sectional view including end surface vicinity region A of electrode foil 111 for an electrolytic capacitor (hereinafter, referred to as "anode foil 111" as appropriate). In anode foil 111 shown in FIG. 3, film thickness T2A of second dielectric layer 104B formed in porous body portion 102A becomes smaller as the distance from first main surface 105 increases and becomes smaller as the distance from end surface 108 increases. That is, film thickness T2A of second dielectric layer 104B has a distribution depending on the distance from first main surface 105 and the distance from end surface 108. On the other hand, in the central portion of the first main surface (region C in FIG. 1), since the deep inner region of the anode foil is sufficiently away from both end surface 108 and first main surface 105, second dielectric layer 104B is not substantially formed. Hence, total thickness T0 of dielectric layer 104 in the deep inner region of region C is approximately equal to film thickness T1 of first dielectric layer 104A.

Meanwhile, total film thickness TA=T1+T2A of dielectric layer 104 in end surface vicinity region A is larger than total thickness T0 of dielectric layer 104 in the deep inner region of region C by film thickness T2A of the second dielectric layer, and becomes smaller as the distance from first main surface 105 increases and as the distance from end surface 108 increases.

The film thickness distribution of dielectric layer 104 shown in FIG. 3 can be obtained by, for example, forming a strip-shaped anode base material by cutting a wide roughened foil on which only first dielectric layer 104A is formed into a predetermined width, and then covering the entire surface of the strip-shaped anode base material with second dielectric layer 104B.

Figure 4:
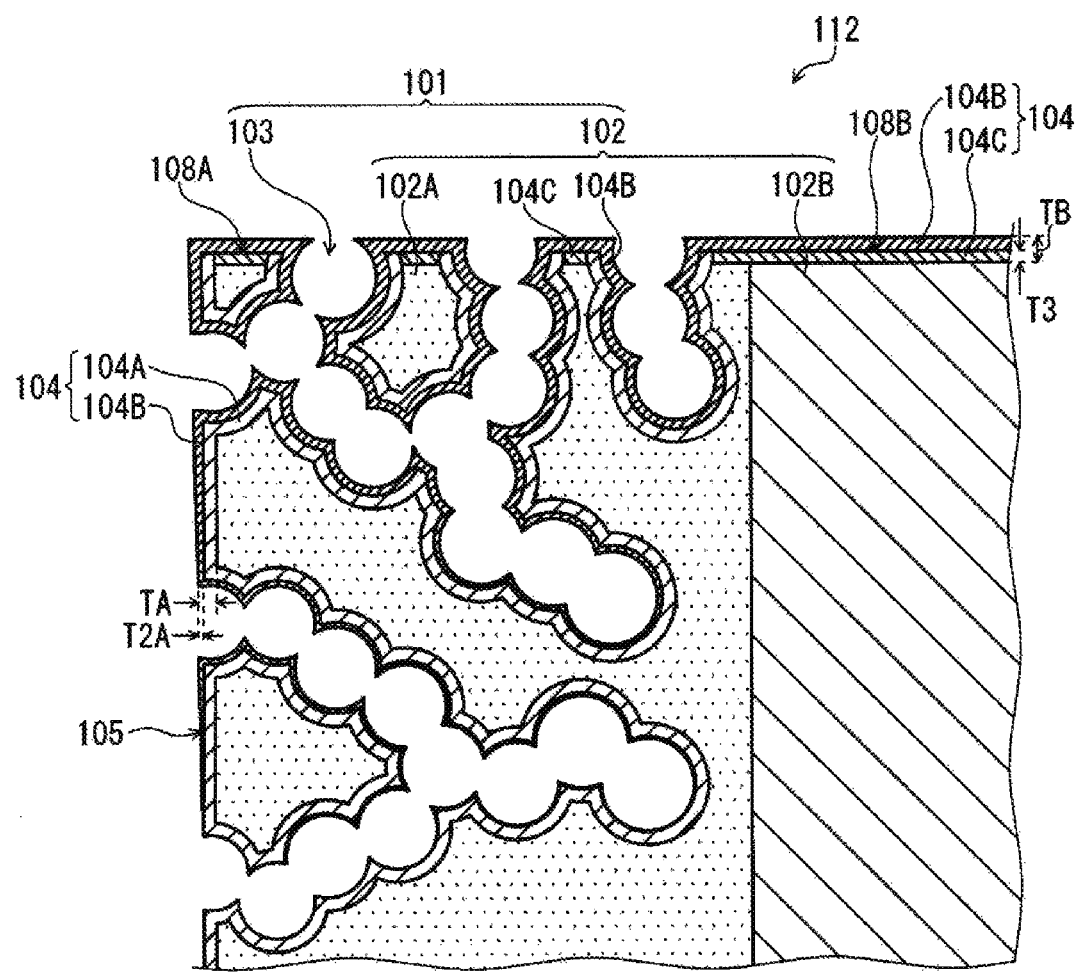
FIG. 4 is an enlarged schematic cross-sectional view illustrating an end surface vicinity region of an electrode foil for an electrolytic capacitor according to another modification of the first exemplary embodiment of the present disclosure.

FIG. 4 shows a modification of the electrode foil for an electrolytic capacitor shown in FIG. 2 which is different from FIG. 3, and shows a cross-sectional view including end surface vicinity region A of electrode foil 112 for an electrolytic capacitor (hereinafter appropriately referred to as "anode foil 112"). In anode foil 112 shown in FIG. 4, similar to anode foil 100 shown in FIG. 2, film thickness T2A of second dielectric layer 104B formed in porous body portion 102A becomes smaller as the distance from end surface 108 (108A) increases, and has a distribution depending on the distance from end surface 108.

Further, in anode foil 112, third dielectric layer 104C is formed on end surfaces 108A and 108B. Third dielectric layer 104C includes a natural oxide film and may be an oxide film formed by performing another anodization (end surface anodization treatment) after cutting the anode foil. Further, second dielectric layer 104B covers third dielectric layer 104C.

As shown in FIG. 4, dielectric layer 104 including second dielectric layer 104B and third dielectric layer 104C is formed on porous body portion 102A at a side close to exposed end surface 108A and core material portion 102B at a side close to exposed end surface 108B. Film thickness TB of dielectric layer 104, which is formed on porous body portion 102A at a side close to exposed end surface 108A and on core material portion 102B at a side close to exposed end surface 108B, is sum (T2+T3) of film thickness of T2 of second dielectric layer 104B on end surface 108 (108A, 108B) and film thickness T3 of third dielectric layer 104C.

The end surface anodization treatment is usually performed by applying a voltage lower than that of the anodization treatment of first main surface 105 and/or second main surface 106. Thus, the end surface anodization treatment does not cause first dielectric layer 104A on first main surface 105 and/or second main surface 106 to further grow and become thicker. Further, film thickness T3 of third dielectric layer 104C is smaller than film thickness T0 of dielectric layer 104 in the deep inner region of region C.

Meanwhile, by forming second dielectric layer 104B after the end surface anodization treatment, film thickness TB of dielectric layer 104 at end surface 108B may be made larger than total thickness T0 of dielectric layer 104 in the deep inner region of region C.

Figure 5:
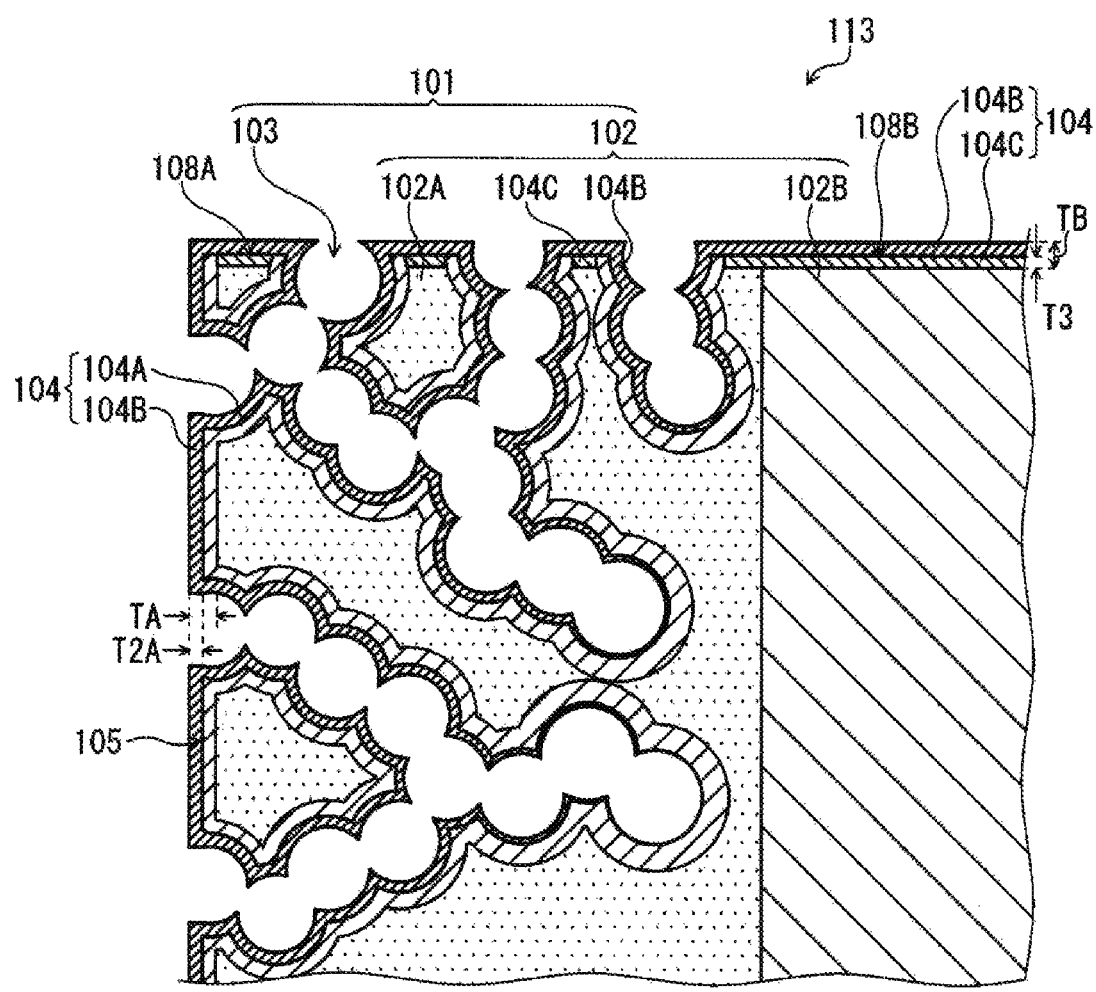
FIG. 5 is an enlarged schematic cross-sectional view illustrating an end surface vicinity region of an example of an electrode foil for an electrolytic capacitor according to a second exemplary embodiment of the present disclosure.

FIG. 5 is a schematic cross-sectional view including end surface vicinity region A of an example of the electrode foil for an electrolytic capacitor according to the second exemplary embodiment of the present disclosure. In FIG. 5, in electrode foil 113 for an electrolytic capacitor (hereinafter, appropriately referred to as "anode foil 113"), similarly to anode foil 111 shown in FIG. 3, film thickness T2A of second dielectric layer 104B formed in porous body portion 102A becomes smaller as the distance from first main surface 105 increases and becomes smaller as the distance from end surface 108 increases. That is, film thickness T2A of second dielectric layer 104B has a distribution depending on the distance from first main surface 105 and the distance from end surface 108. Further, similarly to anode foil 112 shown in FIG. 4, third dielectric layer 104C is formed on end surface 108A and on end surface 108B.

In FIG. 5, film thickness T1A of first dielectric layer 104A in end surface vicinity region A, contrary to second dielectric layer 104B, has a distribution that it increases as the distance from first main surface 105 increases, and it increases as the distance from end surface 108 increases. As a result, total film thickness TA=T1+T2A of dielectric layer 104 in end surface vicinity region A is distributed so as to be substantially uniform regardless of the position in the vicinity region, and is approximately equal to film thickness TB=T2+T3 of dielectric layer 104 formed on exposed end surface 108B.

On the other hand, in the central portion of the first main surface (region C in FIG. 1), second dielectric layer 104B is not substantially formed in the deep inner region of the anode foil, similarly to anode foil 100 shown in FIG. 2. In the deep inner region of region C, film thickness T10 of first dielectric layer 104A is approximately equal to T2+T3, and film thickness T20 of second dielectric layer 104B is approximately zero.

Hence, film thickness T2A of second dielectric layer 104B in end surface vicinity region A is larger than film thickness T20 of second dielectric layer 104B in the deep inner region of region C (T2A>T20). On the other hand, film thickness T1 of first dielectric layer 104A formed on the first main surface is smaller than film thickness T10 of first dielectric layer 104A in the deep inner region of region C (T1<T10). Similarly, film thickness T3 of third dielectric layer 104C is also smaller than film thickness T10 (T3<T10).

The film thickness distribution of dielectric layer 104 shown in FIG. 5 can be obtained, for example, by cutting a non-anodized anode foil, covering the surface of the anode foil with second dielectric layer 104B, and then performing the anodization treatment after the covering with second dielectric layer 104B, thereby performing the anodization treatment of first main surface 105 and/or second main surface 106 and the anodization treatment of end surface 108 at the same time.

The formation of second dielectric layer 104B may be performed after the anodization treatment or before the anodization treatment. After cutting the electrode foil, second dielectric layer 104B may be formed, and then the anodization treatment may be performed.

When anodization is performed after formation of second dielectric layer 104B, first dielectric layer 104A grows toward inside from the inner surface of second dielectric layer 104B in the anodization treatment. The film thickness of first dielectric layer 104A is determined by the voltage applied in the anodization treatment. However, when anodization is performed while it is covered with second dielectric layer 104B, the film thickness of first dielectric layer 104A is smaller than when it is not covered with second dielectric layer 104B.

Further, on the side of end surface 108, third dielectric layer 104C (anodization layer) may be formed integrally with the first dielectric layer also between second dielectric layer 104B and core material portion 102B.

Note that, when the electrode foil is cut, a natural oxide film may be formed on the exposed core material portion of the base material part. In this case, the third dielectric layer includes a metal oxide layer formed on the core material portion by the anodization treatment and a natural oxide film.

Also in anode foils 111 to 113 shown in FIGS. 3 to 5, by covering the exposed portions of core material portion 102B and porous body portion 102A at a side close to end surface 108 with second dielectric layer 104B, a dense dielectric layer is formed on end surface 108. As a result, the withstand voltage of the electrolytic capacitor can be increased and the leak current can be reduced.

Furthermore, in anode foils 112, 113 shown in FIGS. 4 and 5, third dielectric layer 104C is formed on end surface 108 (108A, 108B), so that the withstand voltage of the electrolytic capacitor can be further increased and the effect of reducing the leak current can be further enhanced.

In the exemplary embodiment in which anodization is performed after formation of second dielectric layer 104B (coating layer) (FIG. 5), dielectric layer 104C formed on the end surface and dielectric layer 104A formed along the porous body portion on the first main surface may be formed in the same anodization step. Further, the thickness of the dielectric layer formed on the end surface and the thickness of the dielectric layer formed along the porous body portion on the first main surface may be made substantially equal. As a result, it is possible to suppress the decrease in the electrostatic capacitance of the electrolytic capacitor, increase the withstand voltage, and reduce the leak current.

End surface 108 covered with second dielectric layer 104B (and third dielectric layer 104C) is not limited to one surface, and a plurality of end surfaces may be covered with the second dielectric layer. The anode foil may have a first end surface, as well as the anode foil may have a second end surface and a third end surface which are perpendicular to the first end surface. And a third dielectric layer may be formed on each of the three end surfaces.

[Electrolytic Capacitor]

Figure 6:
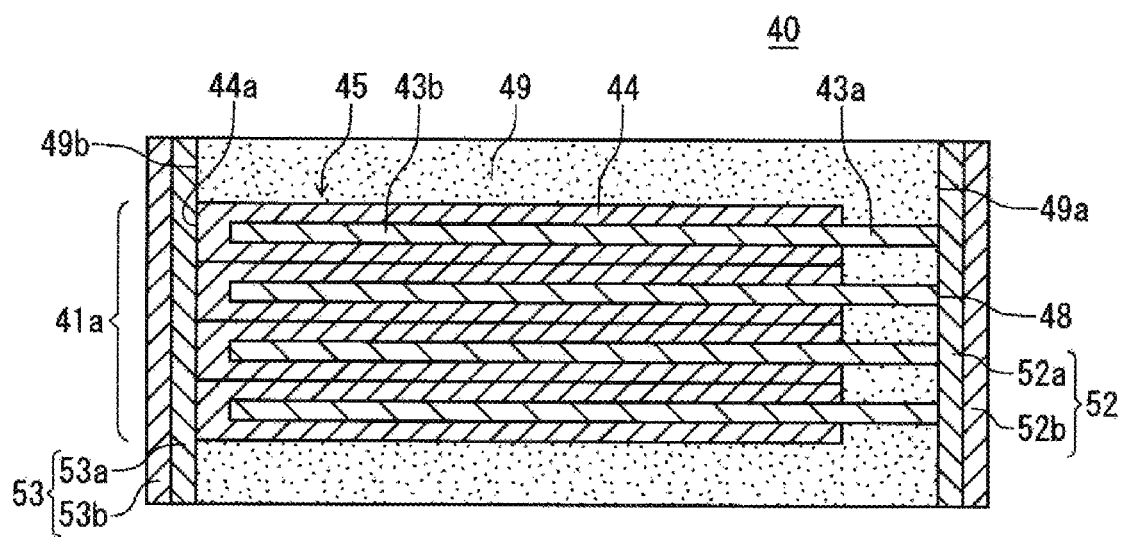
FIG. 6 is a schematic cross-sectional view illustrating an example of an electrolytic capacitor according to a third exemplary embodiment of the present disclosure.
Figure 7:
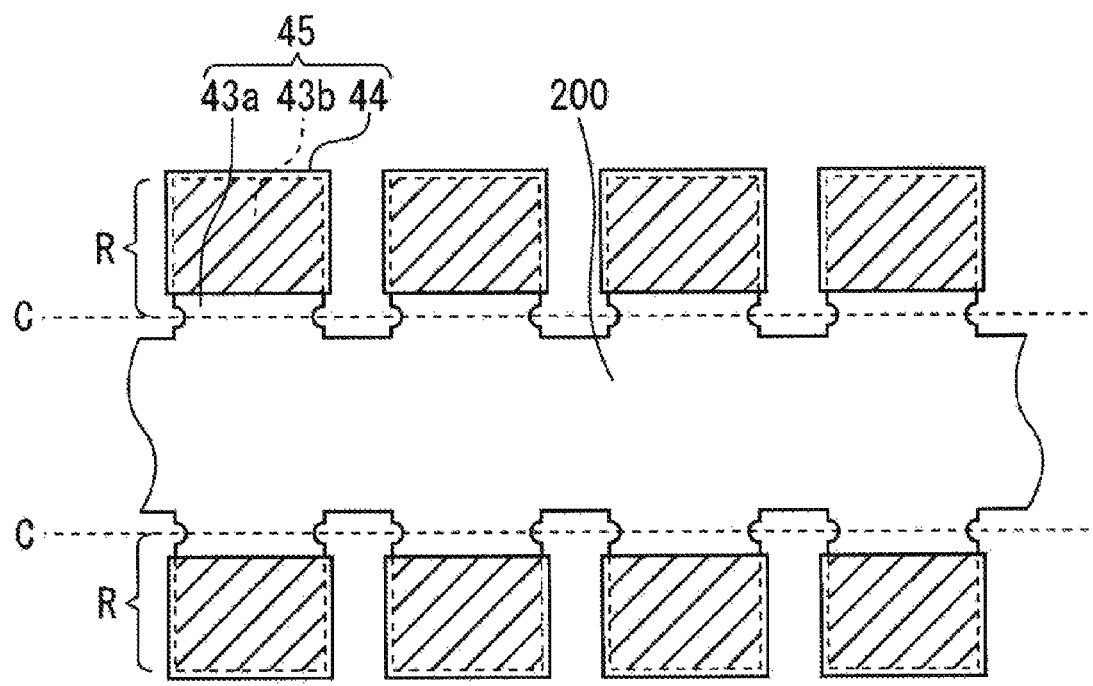
FIG. 7 is a schematic diagram for explaining a structure of an anode foil used to manufacture the electrolytic capacitor of FIG. 6.

FIG. 6 is a schematic cross-sectional view illustrating an example of an electrolytic capacitor according to a third exemplary embodiment of the present disclosure, and FIG. 7 is a schematic view illustrating a structure of an anode foil for manufacturing an anode body included in the electrolytic capacitor.

Electrolytic capacitor 40 shown in FIG. 6 includes laminated body 41a in which a plurality of capacitor elements 45 are laminated. Capacitor element 45 includes an anode body having a dielectric layer (not shown) formed on the surface and having anode lead-out portion 43a and cathode forming portion 43b, and cathode body 44 that covers at least a part of a dielectric layer formed on the surface of cathode forming portion 43b.

Electrolytic capacitor 40 includes exterior body 49 that seals laminated body 41a. Exterior body 49 has a substantially rectangular parallelepiped outer shape, and electrolytic capacitor 40 also has a substantially rectangular parallelepiped outer shape.

End surfaces 48 of a plurality of anode lead-out portions 43a are electrically connected to external electrodes 52 on the anode side, respectively. External electrode 52 on the anode side has first electrode layer 52a that covers a plurality of end surfaces 48 and first side surface 49a of exterior body 49, and second electrode layer 52b formed on the surface of first electrode layer 52a.

Electrolytic capacitor 40 includes cathode-side external electrode 53 electrically connected to cathode body 44. Specifically, a plurality of cathode bodies 44 respectively have end surfaces 44a exposed from second side surface 49b of exterior body 49, and end surfaces 44a of the plurality of cathode bodies 44 are respectively bonded to external electrode 53 on the cathode side. Cathode-side external electrode 53 has cathode-side first electrode layer 53a that covers end surfaces 44a of the plurality of cathode bodies 44 and second side surface 49b of exterior body 49, and cathode-side second electrode layer 53b formed on the surface of cathode-side first electrode layer 53a.

In the plurality of capacitor elements 45, cathode bodies 44 adjacent to each other in the laminating direction are electrically connected to each other via a conductive adhesive layer (not shown).

FIG. 7 shows an example of a structure of an electrode foil for an electrolytic capacitor for manufacturing electrolytic capacitor 40 shown in FIG. 6. Electrode foil 200 for an electrolytic capacitor (hereinafter appropriately referred to as "anode foil 200") has a long strip-shaped portion, and a plurality of regions R disposed in a row so as to protrude from at least one end portion along the longitudinal direction of the strip-shaped portion. Each of the plurality of regions R has anode lead-out portion 43a and cathode forming portion 43b (hatched portion) in order from the strip-shaped portion side. Cathode forming portion 43b has been roughened to form a porous body portion 102A. Note that FIG. 7 shows anode foil 200 with cathode body 44 formed on cathode forming portion 43b.

A plurality of capacitor elements 45 are obtained by forming first dielectric layer 104A and second dielectric layer 104B, covering at least a part of cathode forming portion 43b with cathode body 44, further, cutting the anode foil after forming cathode body 44, for example, in the direction of broken line C of FIG. 7. The electrolytic capacitor shown in FIG. 6 is manufactured by laminating the plurality of capacitor elements 45 and covering capacitor elements 45 with exterior body 49.

Anode foil 200 may be formed by punching a roughened foil, which has been roughened in a predetermined region, into the shape shown in FIG. 7. The punching process may be performed after forming the first dielectric layer on the roughened foil or before forming the first dielectric layer on the roughened foil. By the punching process, cutting surfaces are formed at the three end surfaces of cathode forming portion 43b (two end surfaces perpendicular to the longitudinal direction of the strip-shaped portion and one end surface perpendicular to the protruding direction of region R).

When punching the roughened foil after forming the first dielectric layer, the cutting surface is covered with the second dielectric layer. At this time, entire cathode forming portion 43b may be covered with the second dielectric layer. In this case, the cross-sectional structure of the dielectric layer in the vicinity of the three end surfaces is the structure shown in FIG. 3.

After the punching process, the second dielectric layer may be formed on cathode forming portion 43b, and anodization may be performed after the formation of the second dielectric layer to form the first dielectric layer and the third dielectric layer. In this case, the cross-sectional structure of the dielectric layer in the vicinity of the three end surfaces is the structure shown in FIG. 5.

In the present exemplary embodiment, the second dielectric layer preferably has a higher dielectric constant than the first dielectric layer, which can increase the electrostatic capacitance of the electrolytic capacitor. For example, when the first dielectric layer is aluminum oxide, the second dielectric layer is preferably titanium oxide, niobium oxide, tantalum oxide, or the like, and among them, tantalum oxide is more preferable because it can reduce the leak current around the end surface.

Figure 8:
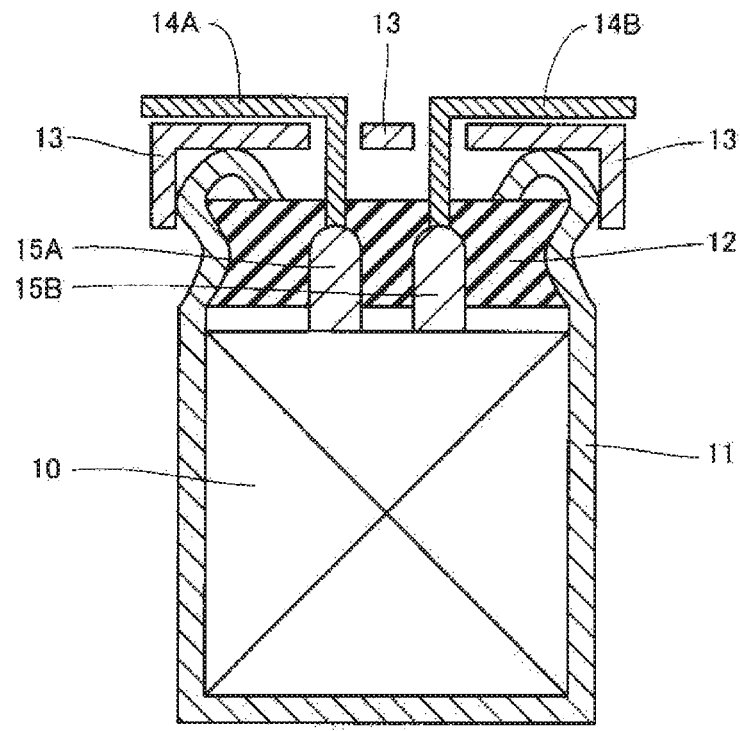
FIG. 8 is a schematic cross-sectional view illustrating an example of an electrolytic capacitor according to a fourth exemplary embodiment of the present disclosure.
Figure 9:
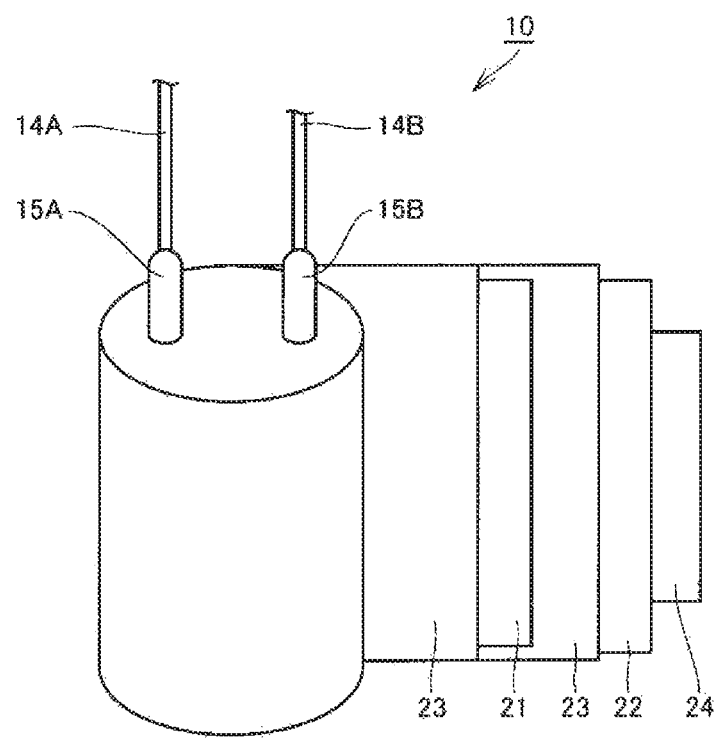
FIG. 9 is a schematic diagram for explaining a structure of a wound body included in the electrolytic capacitor of FIG. 8.

FIG. 8 is a schematic cross-sectional view illustrating an electrolytic capacitor according to a fourth exemplary embodiment of the present disclosure, and FIG. 9 is a schematic diagram in which a part of a wound body included in the electrolytic capacitor of FIG. 8 is expanded.

The electrolytic capacitor includes a laminated body (corresponding to the wound body in FIG. 9) in which an anode body, a separator, and a cathode body are laminated in this order.

The electrolytic capacitor includes, for example, capacitor element 10, bottomed case 11 that houses capacitor element 10, sealing member 12 that closes an opening of bottomed case 11, seat plate 13 that covers sealing member 12, and a liquid component (not shown). Further, the electrolytic capacitor includes lead wires 14A, 14B led out from sealing member 12 and penetrating seat plate 13, lead tabs 15A, 15B connecting the lead wires and the electrodes of capacitor element 10. Capacitor element 10 is housed in bottomed case 11 together with the liquid component. The vicinity of an opening end of bottomed case 11 is drawn inward, and the opening end is curled so as to be swaged by sealing member 12.

Capacitor element 10 is produced from a wound body as shown in FIG. 9. The wound body includes anode body 21 connected to lead tab 15A, cathode body 22 connected to lead tab 15B, and separator 23. Separator 23 is provided so as to be sandwiched between anode body 21 and cathode body 22.

Separator 23 is preferably a porous body made of cellulosic fibers and capable of impregnating an electrolytic solution in the fibers. As the material of separator 23, for example, a non-woven fabric or a film containing natural cellulose, synthetic cellulose, polyethylene terephthalate, vinylon, aramid fiber or the like as a main component can be used.

Anode body 21 and cathode body 22 are wound with separator 23 in between. The outermost circumference of the wound body is fixed by winding stop tape 24. Note that FIG. 9 shows a state in which a part of the wound body is unrolled before the outermost circumference is stopped. Anode body 21 includes a metal foil roughened such that the surface has irregularities, and a dielectric layer is formed on the main surface of the metal foil having irregularities.

Capacitor element 10 may further include a solid electrolyte layer. The solid electrolyte layer can be formed by attaching a conductive polymer to at least a part of the surface of the dielectric layer. The solid electrolyte layer may cover at least a part of the surface of cathode body 22 and/or the surface of separator 23. Capacitor element 10 is housed in bottomed case 11 together with the electrolytic solution (not shown).

For anode body 21, the electrode foil for an electrolytic capacitor according to the exemplary embodiment of the present disclosure may be used. That is, before producing the wound body, both end surfaces each perpendicular to the width direction of anode body 21 (the direction parallel to the winding axis in FIG. 9) may be covered with second dielectric layer 104B in advance. Alternatively, anode body 21, separator 23, and cathode body 22 may be laminated in this order to produce a wound body, and then covering with second dielectric layer 104B may be performed by covering the wound body.

Figure 10:
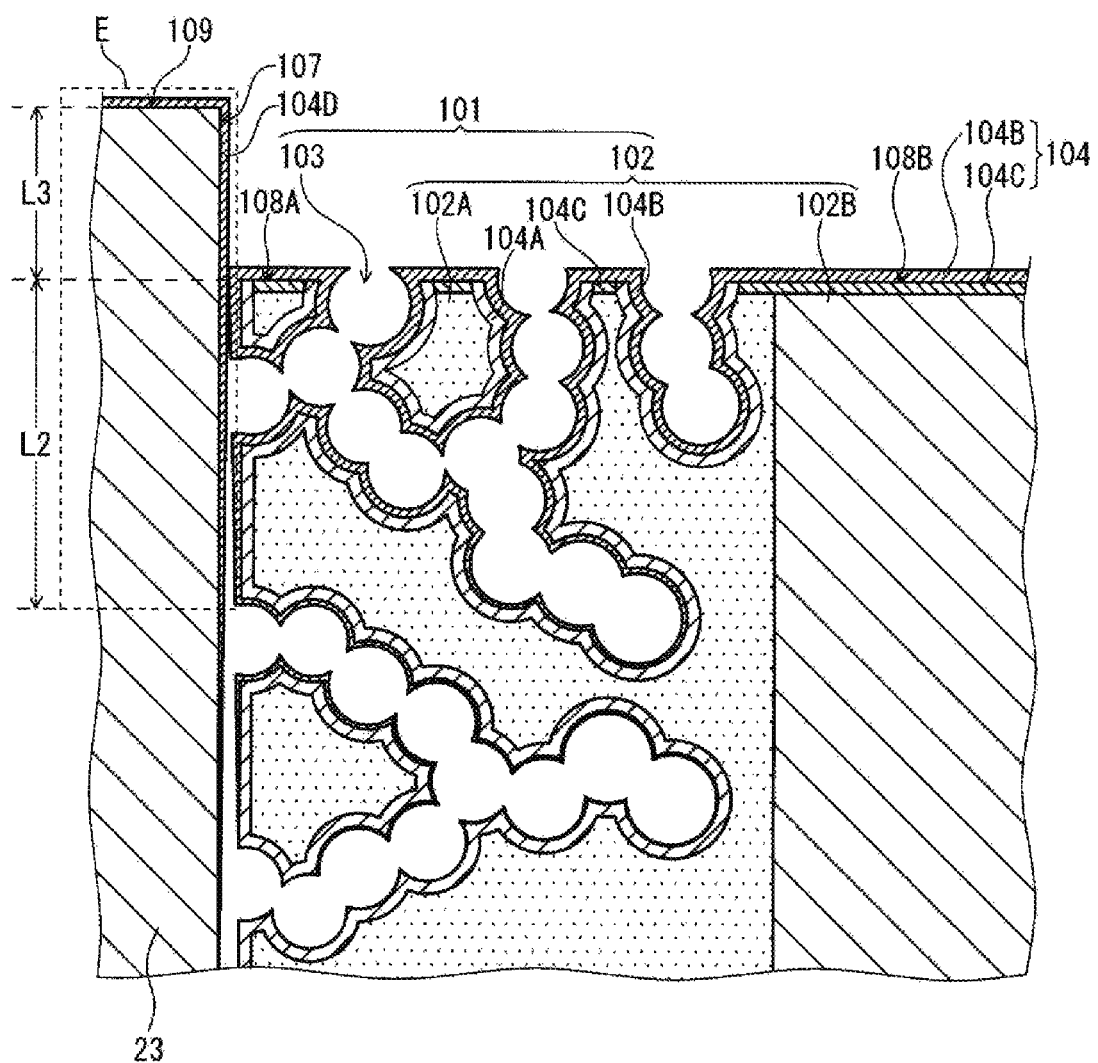
FIG. 10 is an enlarged schematic cross-sectional view illustrating an end surface vicinity region of the wound body according to the fourth exemplary embodiment.

FIG. 10 shows a cross-sectional structure at the end portion of the wound body including anode body 21 and the end surface of separator 23 facing anode body 21 when the wound body is covered with a dielectric layer. The structure in the vicinity of end surface 108 of anode body 21 is the same as that in FIG. 4, and the description thereof will be omitted.

As shown in FIG. 10, separator 23 has third main surface 107. Separator 23 also has a fourth main surface (not shown) on the back surface of third main surface 107, and the third main surface and the fourth main surface are connected via end surface 109. Fourth dielectric layer 104D covers the end portion of the separator.

In the example of FIG. 10, end surface 109 of the separator protrudes from the end surface of the anode body. Therefore, at the end portion of the separator, third main surface 107 mostly faces first main surface 105 of anode body 21, but has a region not facing first main surface 105 (non-facing region) of the anode body partly on end surface 109. Fourth dielectric layer 104D covers the non-facing region.

Fourth dielectric layer 104D further penetrates also into a gap between first main surface 105 and main surface (third main surface) 107 of the separator facing first main surface 105, and may also be formed on at least a part of the outer surface of the first main surface and/or the third main surface that surrounds the gap. That is, fourth dielectric layer 104D may also be formed in a region (end portion facing region) on third main surface 107 having a depth from the non-facing region in a predetermined distance or less, and/or also in a region on first main surface 105 facing the end portion facing region. Hereinafter, the region on third main surface 107, which is composed of the non-facing region and the end portion facing region, is referred to as end portion region E.

On first main surface 105 facing end portion region E and/or the end portion facing region, the film thickness of fourth dielectric layer 104D becomes smaller as the distance from end surface 109 increases.

Note that, the separator is a porous body, but the shape of the porous body is not shown in FIG. 10. Fourth dielectric layer 104D is formed along the base material (for example, fibers) of the separator in end portion region E.

Since end portion region E of the separator is covered with fourth dielectric layer 104D, the effect of increasing the withstand voltage of the electrolytic capacitor and the effect of reducing the leak current can be further increased. Moreover, the mechanical strength of the electrolytic capacitor is increased, and the impact resistance can be increased.

It is preferable that fourth dielectric layer 104D is formed by penetrating into a gap between first main surface 105 and third main surface 107 over the same depth as the distance from the end surface of the separator to the end surface of the anode body (that is, the width of the non-facing region) in the separator. In other words, width L2 of the end portion facing region is preferably equal to or larger than width L3 of the non-facing region. For example, when the distance from the end surface of the separator to the end surface of the anode body is 500 µm, it is preferable that fourth dielectric layer 104D is formed by penetrating also into a gap between first main surface 105 and third main surface 107 to the position of 500 µm in the depth from the end surface of the anode body. As a result, deterioration of the separator due to heat generated when the dielectric layer is repaired at the end portion of the anode body can be suppressed, and the withstand voltage of the electrolytic capacitor can be increased.

The covering of the region including end portion region E with fourth dielectric layer 104D may be performed simultaneously with the covering of end surface 108 (108A, 108B) of anode body 21 with second dielectric layer 104B, or the covering with fourth dielectric layer 104D and the covering with second dielectric layer 104B may be performed separately.

Note that, contrary to FIG. 10, the end surface of the anode body may protrude from end surface 109 of the separator. In this case, at the end portion of the separator, first main surface 105 of the anode body has a region (non-facing region) that does not face third main surface 107 of the separator. Also in this case, fourth dielectric layer 104D can be formed by covering the non-facing region and penetrating into the gap between first main surface 105 and third main surface 107, and the effect of increasing the withstand voltage of the electrolytic capacitor and the effect of reducing the leak current can be further increased.

[Method for Manufacturing Electrode Foil for Electrolytic Capacitor]

Next, a method for manufacturing an electrode foil for an electrolytic capacitor, including steps (a-i) to (a-iv) according to the present exemplary embodiment will be described. However, the manufacturing method is not limited to the following.

Step (a-i) is a step of preparing a roughened foil including a base material part having a porous body portion.

Step (a-ii) is a step of forming at least a first dielectric layer on the base material part.

Step (a-iii) is a step (roughened foil cutting step) of cutting the roughened foil at a predetermined position to obtain an anode base material having a base material part exposed at the cutting surface.

Step (a-iv) is a step of covering the cutting surface of the anode base material with the second dielectric layer by an atomic layer deposition method after the roughened foil cutting step.

Hereinafter, each step will be described in more detail.

(a-i) Step of Preparing a Roughened Foil

For example, a metal material formed of a first metal is prepared. The form of the metal material is not particularly limited, but a metal foil is preferably used. Hereinafter, description will be continued assuming a case where a metal foil is used.

The type of the first metal is not particularly limited, but it is preferable to use a valve metal such as aluminum (Al), tantalum (Ta), and niobium (Nb) or an alloy containing a valve metal, because the first dielectric layer is easily formed. The thickness of the metal foil is not particularly limited, but is, for example, 5 μm or more and 300 μm or less.

Next, a part of the metal foil (at least a part of an outer part) is made porous or roughened to form a plurality of pits or pores in the outer part of the metal foil. At this time, a roughened foil including base material part 102 having porous body portion 102A is obtained. Base material part 102 has metal core material portion 102B and porous body portion 102A formed continuously with the core material portion. Porous body portion 102A may be formed only on one surface (first main surface) of the roughened foil, or may be formed on both surfaces (first main surface and second main surface).

Porous body portion 102A is preferably formed by etching a metal foil. The etching process is performed by, for example, DC etching with a DC current or AC etching with an AC current.

The pore diameter of the pit or pore 103 of porous body portion 102A is not particularly limited, but it is preferably 50 nm or more and 2000 nm or less, because the surface area of porous body portion 102A can be increased, and second dielectric layer 104B is easily formed to a deep inner region of the pit. The pore diameter of the pit is, for example, a modal pore diameter of the pore distribution measured by a mercury porosimeter.

The depth of the pit is also not particularly limited, and may be set appropriately according to the thickness of the metal foil. While the surface area of porous body portion 102A can be increased and the strength of the electrode foil is easily maintained, the thickness of porous body portion 102A or the etching region is preferably 1/10 or more and 4/10 or less of the thickness of the metal foil before being etched. The thickness of porous body portion 102A or the etching region is an average value of thicknesses at arbitrary 10 points in the cross section of the roughened foil observed in an scanning electron microscope (SEM) image of the electrode foil.

(a-ii) Step of Forming the First Dielectric Layer on the Base Material Part

Then, at least porous body portion 102A of base material part 102 is anodized to form first dielectric layer 104A on porous body portion 102A. The first dielectric layer is preferably an oxide of the first metal.

The method for anodizing porous body portion 102A is not particularly limited. For example, it can be performed by immersing porous body portion 102A in an anodizing solution such as an ammonium adipate solution, and anodizing by applying a voltage to base material part 102 (porous body portion 102A). When the anodizing treatment is performed on the base material part before covering the second dielectric layer, the thickness of first dielectric layer 104A does not depend on the position of porous body portion 102A, and is an uniform film thickness according to the applied voltage at the time of anodization. The voltage (first voltage) applied in the anodizing treatment is, for example, 1 V to 200 V, and more preferably 5 V to 160 V.

Since the thickness of first dielectric layer 104A and second dielectric layer 104B is much smaller than thickness D0 of porous body portion 102A of base material part 102, the thickness of the region of pore 103 or the etching region can be regarded as the thickness of porous body portion 102A.

The formation of first dielectric layer 104A may be performed before or after the roughened foil cutting step (step (a-iii)). When forming first dielectric layer 104A after the roughened foil cutting step (step (a-iii)), at the same time as forming first dielectric layer 104A on porous body portion 102A, third dielectric layer 104C can be formed on the cutting surfaces of porous body portion 102A and core material portion 102B.

(a-iii) Roughened Foil Cutting Step

Then, the roughened foil is cut at a predetermined position to obtain an anode base material with the base material part exposed. This step, if it is after the step of preparing the roughened foil (step (a-i)), may be performed before the step of forming the first dielectric layer (step (a-ii)) or may be performed after the step of forming the first dielectric layer (step (a-ii)). For example, when a roughened foil wound in a wide hoop shape (wound body) is used, the hoop-shaped anode base material may be cut from the roughened foil at a predetermined position according to the characteristics of the electrolytic capacitor to form the hoop-shaped anode base material.

(a-iv) Step of Covering the Cutting Surface with a Second Dielectric Layer

Next, after the roughened foil cutting step, at least the cutting surface of the anode body is covered with second dielectric layer 104B. For example, when the anode base material is wound in a hoop shape (wound body), the cutting surface formed by the roughened foil cutting step in a state wound in the hoop-shape may be covered with the second dielectric layer.

Second dielectric layer 104B covers the cutting surfaces (end surfaces 108A, 108B), is formed along the surface of pores 103 of porous body portion 102A, and covers porous body portion 102A. The thickness of the second dielectric layer is not particularly limited, but is, for example, 0.5 nm or more and 200 nm or less. The ratio of the thickness of the second dielectric layer to the thickness of the first dielectric layer is not particularly limited, and may be set appropriately according to the application and desired effects. The thickness of the second dielectric layer is preferably 1 time or more and 3 times or less, and preferably 1.1 times or more and 2 times or less, of thickness T0 of the first dielectric layer. Also, the second dielectric layer is preferably an oxide of a second metal.

The thickness of the second dielectric layer and the first dielectric layer is an average value of the thicknesses at any 10 points in the cross section of second dielectric layer 104B and first dielectric layer 104A observed in the transmission electron microscope (TEM) image of the electrode foil.

The ALD method is a film forming method for forming a layer containing an oxide of the second metal (second dielectric layer) on the surface of an object by alternately supplying a source gas containing a second metal and an oxidant to a reaction chamber in which the object is placed. In the ALD method, a self-limiting action works, so that the second metal is deposited on the surface of the object in atomic layer units. Thus, a cycle in which (1) supply of the source gas, (2) exhaust (purge) of the source gas, (3) supply of the oxidant, and (4) exhaust (purge) of the oxidant are set as one cycle, and a number of cycles controls the thickness of the second dielectric layer. That is, the ALD method is a preferable method because the thickness of the formed layer can be easily controlled. Further, the ALD method can be performed at room temperature (25° C.) to 400° C., as opposed to the chemical vapor deposition (CVD) performed at 400° C. to 900° C. That is, the ALD method is also preferable because it can suppress thermal damage to the anode base material and the first dielectric layer.

In the ALD method, a thin film can be formed on the surface of a relatively deep portion of the pit if the modal diameter of the pit is about 10 nm, for example. As described above, the pit formed in porous body portion 102A usually has a pore diameter of 50 nm or more. Hence, according to the ALD method, the second dielectric layer can be formed also on the surface of a relatively deep portion of a deep pit having a small pore diameter, that is, a pit having a large aspect ratio.

According to the ALD method, as shown in FIG. 2, it is possible to easily form an electrode foil in which second dielectric layer 104B is formed up to the deep portion of the pit at least on a side of end surface 108. It is also easy to distribute the second metal to a side of core material portion 102B from the position in porous body portion 102A that is 0.25D0 away from core material portion 102B, and it is also possible to distribute the second metal to the position 0.05D0 away from core material portion 102B.

The second metal forming the ALD layer (second dielectric layer) and the first metal forming the oxide layer (first dielectric layer) may be the same or different. When Al is used as the first metal and a metal different from the first metal is used as the second metal, Ta, Nb, Si, Ti, Zr, Hf, W and the like are preferable as the second metal. These may be used alone or in combination of two kinds or more. In this case, the second dielectric layer may contain one or more of $Ta_2O_5$, $Nb_2O_5$, $SiO_2$, $TiO_2$, $ZrO_2$, $HfO_2$, $WO_3$, and the like. When the second dielectric layer contains two or more kinds of oxides of the second metal, the oxides may be mixed and may be disposed in layers. Among them, $Ta_2O_5$, $ZrO_2$, $Nb_2O_5$, $TiO_2$, $HfO_2$, and the like are preferable as the oxide of the second metal because it is easy to increase the capacitance of the electrolytic capacitor. From the viewpoint of improving the withstand voltage of the electrolytic capacitor, $Ta_2O_5$, $ZrO_2$, $WO_3$ and $SiO_2$ are preferable.

Examples of the oxidant used in the ALD method include water, oxygen, and ozone. The oxidant may be supplied to the reaction chamber as plasma using the oxidant as a raw material.

When a precursor (precursor) containing the second metal is gasified and supplied into the reaction chamber, the second metal is supplied onto first dielectric layer 104A formed on porous body portion 102A of the anode base material disposed in the reaction chamber. The precursor is an organometallic compound containing a second metal, which makes it easier for the second metal to be chemisorbed to an object. As the precursor, various organometallic compounds conventionally used in the ALD method can be used.

Examples of a precursor containing Ti include bis (t-butylcyclopentadienyl) titanium (IV) dichloride ($C_{18}H_{26}Cl_2Ti$), tetrakis (dimethylamino) titanium (IV) ($[(CH_3)_2N]_4Ti$, TDMAT), tetrakis (Diethylamino) titanium (IV) ($[(C_2H_5)_2N]_4Ti$), tetrakis (ethylmethylamino) titanium (IV) (Ti [N ($C_2H_5$) ($CH_3$)]$_4$), titanium (IV) (diisopropoxy Dobis (2,2,6,6-tetramethyl-3,5-heptanedionate) (Ti [OCC ($CH_3$)$_3$CHCOC ($CH_3$)$_3$]$_2$ ($OC_3H_7$)$_2$), titanium tetrachloride ($TiCl_4$), titanium (IV) isopropoxide (Ti [OCH ($CH_3$)$_2$]$_4$), and titanium (IV) ethoxide (Ti [O($C_2H_5$)]$_4$).

Examples of a precursor containing Zr include bis (methyl-$\eta^5$ cyclopentadienyl) methoxymethyl zirconium (Zr ($CH_3C_5H_4$)$_2$$CH_3OCH_3$), tetrakis (dimethylamido) zirconium (IV) ($[(CH_3)_2N]_4Zr$), tetrakis (Ethylmethylamido) zirconium (IV) (Zr ($NCH_3C_2H_5$)$_4$), and zirconium (IV) t-butoxide (Zr [OC ($CH_3$)$_3$]$_4$).

Examples of a precursor containing Nb include niobium (V) ethoxide (Nb ($OCH_2CH_3$)$_5$, and tris (diethylamido) (t-butylimide) niobium (V) ($C_{16}H_{39}N_4Nb$).

Examples of a precursor containing Si include N-sec-butyl (trimethylsilyl) amine ($C_7H_{19}NSi$), 1,3-diethyl-1,1,3,3-tetramethyldisilazane ($C_8H_{23}NSi_2$), 2,4,6,8,10-Pentamethylcyclopentasiloxane (($CH_3SiHO$)$_5$), pentamethyklisilane (($CH_3$)$_3$SiSi ($CH_3$)$_2$H), tris (isopropoxy) silanol ($[(H_3C)_2CHO]_3SiOH$), chloropentanemethyldisilane (($CH_3$)$_3$SiSi ($CH_3$)$_2$Cl), dichlorosilane ($SiH_2Cl_2$), triclimethylaminosilane (Si [N ($CH_3$)$_2$]$_4$), tetraethylsilane (Si ($C_2H_5$)$_4$), tetramethylsilane (Si ($CH_3$)$_4$), tetraethoxysilane (Si ($OC_2H_5$)$_4$), dodecamethylcyclohexasilane ((Si ($CH_3$)$_2$)), silicon tetrachloride ($SiCl_4$), and silicon tetrabromide ($SiBr_4$).

Examples of a precursor containing Ta include (t-butylimide) tris (ethylmethylamino) tantalum (V) ($C_{13}H_{33}N_4Ta$, TBTEMT), tantalum (V) ethoxide (Ta ($OC_2H_5$)$_5$), (t-butylimide) tris (diethylamino) tantalum (V) (($CH_3$)$_3$CNTa (N ($C_2H_5$)$_2$)$_3$), and pentakis (dimethylamino) tantalum (V) (Ta (N ($CH_3$)$_2$)$_5$).

Examples of a precursor containing Hf include hafnium tetrachloride ($HfCl_4$), tetrakisdimethylaminohafnium (Hf [N ($CH_3$)$_2$]$_4$), tetrakisethylmethylaminohafnium (Hf [N ($C_2H_5$) ($CH_3$)]$_4$), tetrakisdiethylaminohafnium (Hf [N ($C_2H_5$)$_2$]$_4$), and hafnium-t-butoxide (Hf [OC ($CH_3$)$_3$]$_4$).

The covering of the second dielectric layer (step (a-iv)) may be performed before the formation of the first dielectric layer (step (a-ii)). By forming the second dielectric layer on the anode base material and then forming the first dielectric layer (step (a-ii)), for example, an electrode foil having a cross-sectional structure shown in FIG. 5 can be manufactured.

According to the ALD method, a thin and uniform oxide of the second metal (second dielectric layer 104B) is formed, but defects such as pinholes may be formed in the deep portion of the pit. However, by performing a anodization treatment for growing first dielectric layer 104A after the formation of the ALD layer, in the anodization treatment, the ionized first metal diffuses to the inside of the oxide of the second metal, and the defects in second dielectric layer 104B are repaired. Second dielectric layer 104B formed by such a method may contain a complex oxide of the first metal and the second metal (when the first metal and the second metal are different). First dielectric layer 104A containing an oxide of the first metal is formed between porous body portion 102A and second dielectric layer 104B.

Thus, by performing the covering of the ALD layer before the anodization treatment, it is possible to form the dielectric layer with reduced defects along pores 103. This makes it possible to manufacture an electrolytic capacitor having a high withstand voltage and a reduced leak current.

On the other hand, the thickness of first dielectric layer 104A is smaller than that in the case where porous body portion 102A in which second dielectric layer 104B is not formed is anodized under the same conditions. Furthermore, the thicker second dielectric layer 104B is, the smaller the thickness of first dielectric layer 104A is. This is because the elution of the first metal during the anodization treatment is suppressed and the defects of the oxide of the second metal to be repaired by the first metal increase. Hence, when second dielectric layer 104B is formed using an oxide of the second metal having a higher relative dielectric constant than the oxide of the first metal, and then first dielectric layer 104A is formed by anodization, the capacitance of the electrolytic capacitor can be further increased. This is because the film thickness of first dielectric layer 104A containing the first metal having a low relative dielectric constant is small.

[Method for Manufacturing Electrolytic Capacitor]

Next, a method for manufacturing an electrolytic capacitor including steps (b-i) to (b-v) according to the present exemplary embodiment will be described. However, the manufacturing method is not limited to the following.

Step (b-i) is a step of preparing a roughened foil including a base material part having a porous body portion.

Step (b-ii) is a step of forming at least a first dielectric layer on the base material part.

Step (b-iii) is a step (roughened foil cutting step) of cutting the roughened foil at a predetermined position to obtain an anode base material having a base material part exposed at the cutting surface.

Step (b-iv) is a step of separating an anode body from the anode base material to form a capacitor element including the anode body.

Step (b-v) is a step of covering the cutting surface of the anode body with a second dielectric layer by an atomic layer deposition method after the roughened foil cutting step.

In the method for manufacturing an electrolytic capacitor according to the present exemplary embodiment, the step of forming the first dielectric layer (step (b-ii)) is a step of applying a predetermined first voltage to the anode base material to perform an anodizing treatment. The method may further include a step (step (b-vi)) of applying a second voltage lower than the first voltage to the anode body to perform an anodizing treatment and growing a third dielectric layer on the cutting surface.

Step (b-i) to step (b-iii), and, step (b-v), respectively, correspond to step (a-i) to step (a-iv) of the method for manufacturing an electrode foil for an electrolytic capacitor, and thus a detailed description is omitted.

Hereinafter, step (b-iv) will be described in detail.

(b-iv) Step of Forming Capacitor Element

After step (b-iii), the anode body is separated from the anode base material to form a capacitor element. For example, a capacitor element is formed by forming a laminated body in which an anode body, a separator, and a cathode body are laminated in this order. Then, the laminated body is housed in a case, and porous body portion 102A of the anode body is impregnated with at least one of the electrolytic solution and the solid electrolyte, whereby the electrolytic capacitor shown in FIG. 8, for example, can be manufactured. The solid electrolyte may be impregnated into porous body portion 102A to form a solid electrolyte layer, and then further impregnated with an electrolytic solution.

Alternatively, the capacitor element may be formed by laminating the anode body, the solid electrolyte layer, and the cathode body in this order.

Note that the anode base material refers to, for example, anode foil 200 having the strip-shaped portion in FIG. 7 and the hoop-shaped anode foil, and a shape that can be mounted on a capacitor is called an anode body.

When forming the above-mentioned laminated body, the covering of the cutting surface with the second dielectric layer (step (b-v)) may be performed before forming the laminated body or after forming the laminated body. When the covering with second dielectric layer 104B is performed after the formation of the laminated body, in addition to the cutting surface, the exposed end portion of the separator can be simultaneously covered with fourth dielectric layer 104D, and a gap between the separator and the anode body can be covered with a fourth dielectric layer. As a result, an electrolytic capacitor having the cross-sectional structure of the laminated body shown in FIG. 10 is obtained.

The electrolytic solution may be a non-aqueous solvent, or may be a mixture of a non-aqueous solvent and an ionic substance (solute, e.g., organic salt) dissolved in the non-aqueous solvent. The organic salt is a salt in which at least one of an anion and a cation contains an organic substance. The non-aqueous solvent may be an organic solvent or an ionic liquid. As the non-aqueous solvent, a high boiling point solvent is preferable. Since such an electrolytic solution has a high polarity, the dynamic contact angle of water in a porous part is low, and the higher the wettability of the porous part with water is, the higher the impregnation property of the electrolytic solution in the porous part is, and the electrostatic capacitance becomes large.

As the non-aqueous solvent, for example, polyhydric alcohols such as ethylene glycol and propylene glycol, cyclic sulfones such as sulfolane, lactones such as γ-butyrolactone, N-methylacetamide, N, N-dimethylformamide, amides such as N-methyl-2-pyrrolidone, esters such as methyl acetate, carbonate compounds such as propylene carbonate, ethers such as 1,4-dioxane, ketones such as methyl ethyl ketone, and formaldehyde can be used.

As the organic salt, for example, trimethylamine maleate, triethylamine borodisalicylate, ethyldimethylamine phthalate, mono-1,2,3,4-tetramethylimidazolinium phthalate, and mono-1,3-dimethyl-2-ethyl imidazolinium phthalate may be used.

The solid electrolyte contains, for example, a manganese compound or a conductive polymer. As the conductive polymer, polypyrrole, polythiophene, polyaniline and their derivatives, and the like can be used.

The solid electrolyte layer containing a conductive polymer can be formed, for example, by chemical polymerization and/or electropolymerization of a raw material monomer on the second dielectric layer. Since the polymerization reaction is carried out in a liquid phase containing water, the lower the dynamic contact angle of water in the porous part and the higher the wettability of the porous part with water, the higher the impregnation property of the raw material monomer to the deep portion of the porous part becomes, and the conductive polymer is formed even in the deep portion. Thus, the electrostatic capacitance becomes large.

The solid electrolyte layer containing the conductive polymer may be formed by impregnating or applying a solution in which the conductive polymer is dissolved or a dispersion liquid in which the conductive polymer is dispersed into the second dielectric layer. Since such a solution and a dispersion liquid contain water, the lower the dynamic contact angle of water in the porous body portion and the higher the wettability of the porous body portion with water, the higher the impregnation property of the conductive polymer in the deep portion of the porous body portion becomes, and the electrostatic capacitance becomes large.

(b-vi) Anodizing Treatment Step of Cutting Surface

After the formation of first dielectric layer 104A, base material part 102 may be subjected to another anodizing treatment. As a result, third dielectric layer 104C can be grown on the cutting surface and the withstand voltage of the electrolytic capacitor can be further increased.

The anodizing treatment on the cutting surface at this time is usually performed at a voltage (second voltage) lower than the voltage (first voltage) at the time of forming first dielectric layer 104A. The voltage applied in the anodizing treatment of the cutting surface is, for example, 0.5 V to 180 V, and more preferably 3 V to 140 V.

Hence, first dielectric layer 104A formed on the main surface (first main surface 105) of the anode base material does not grow further and does not become thicker, and third dielectric layer 104C grows on the cutting surface. The film thickness of third dielectric layer 104C is smaller than that of first dielectric layer 104A.

The second voltage may be applied to the anode base material before forming the capacitor element, or the second voltage may be applied to the anode body with respect to the laminated body after forming the capacitor element. The application of the second voltage may be performed before or after the covering of the second dielectric layer (step (b-iv)).

When the covering of the second dielectric layer (step (b-v)) is performed after the anodization step (b-vi) of the cutting surface, the film thickness of the dielectric layer formed on the cutting surface is the sum of the film thickness of third dielectric layer 104C and the film thickness of second dielectric layer 104B. Hence, it is also possible to form the total film thickness of the dielectric layers formed on the cutting surface to be larger than the film thickness of first dielectric layer 104A. As a result, an electrolytic capacitor having the cross-sectional structure of the electrode foil shown in FIG. 4 can be manufactured. Further, it is also possible to form the film thickness of second dielectric layer 104B to be larger than the film thickness of first dielectric layer 104A.

On the other hand, when the anodization step (b-vi) of the cutting surface is performed after the covering of the second dielectric layer (step (b-v)), if the film thickness of the second dielectric layer is sufficiently thick with respect to the anodization voltage of the cutting surface, third dielectric layer 104C is not substantially formed. That is, by making the film thickness of the second dielectric layer sufficiently large with respect to the anodization voltage of the cutting surface, the film thickness of the dielectric layer formed on the cutting surface can be also formed to be larger than the film thickness of first dielectric layer 104A. Also in this case, the defects in first dielectric layer 104A and second dielectric layer 104B are repaired in the anodization step, and a denser dielectric layer can be obtained. In particular, in the step of forming the capacitor element, defects such as cracks are easily caused on the surface of the dielectric layer. However, the defects of the dielectric layer caused by the formation of the capacitor element can be repaired by performing step (b-vi) after formation of the capacitor element (step (b-iv)) and covering of the second dielectric layer (step (b-v)).

In the above exemplary embodiment, the method for manufacturing the wound-type electrolytic capacitor shown in FIG. 8 has been described as an example, but the scope of application of the present disclosure is not limited to the above, and can also be applied to the manufacture of other electrolytic capacitors, for example, the chip-type electrolytic capacitor shown in FIG. 6.

The electrode foil for an electrolytic capacitor according to the present disclosure can be used as an anode of an electrolytic capacitor, and particularly can be used for an electrolytic capacitor that is required to have a high withstand voltage.

What is claimed is:

1. An electrode foil for an electrolytic capacitor, the electrode foil comprising:
   an anode electrode body including a base material part having a porous body portion; and
   a dielectric layer disposed on a surface of the porous body portion,
   wherein:
   the anode electrode body has a first main surface in which pores of the porous body portion are opened, a second main surface opposite to the first main surface, and an end surface connecting the first main surface and the second main surface,
   the base material part further has a core material portion that is not porous, the core material portion being disposed consecutively with the porous body portion,
   the dielectric layer is formed on the end surface in the porous body portion and on an end surface of the core material portion, and
   in the porous body portion, a first film thickness of the dielectric layer in an end surface vicinity region is larger than a second film thickness of the dielectric layer in a deep inner region, the end surface vicinity region being a region within a predetermined distance from the end surface, the deep inner region being a region located away from the first main surface and at a central portion in a direction parallel to the first main surface.

2. The electrode foil according to claim 1, wherein the end surface vicinity region includes a region within at least 1 μm from the end surface.

3. The electrode foil according to claim 1, wherein the first film thickness of the dielectric layer decreases as a distance from the end surface in the porous body portion increases.

4. The electrode foil according to claim 1, wherein
   a third film thickness of the dielectric layer at the end surface of the core material portion is larger than the second film thickness.

5. An electrolytic capacitor comprising an anode body using the electrode foil according to claim 1.

6. An electrolytic capacitor comprising a laminated body including an anode body using the electrode foil according to claim 1, a separator, and a cathode body, the anode body, the separator, and the cathode body being laminated in this order,
   wherein an end portion of the separator is covered with an insulating layer.

7. The electrolytic capacitor according to claim 6, wherein:
   the separator has a third main surface facing the first main surface of the base material part in the electrode foil, and
   the insulating layer is disposed in at least one of a first region of the first main surface and a second region of the third main surface, the first region facing the third main surface, the second region facing the first main surface.

8. An electrode foil for an electrolytic capacitor, the electrode foil comprising:
   an anode electrode body including a base material part having a porous body portion; and
   a dielectric layer disposed on a surface of the porous body portion, wherein:

the anode electrode body has a first main surface in which pores of the porous body portion are opened, a second main surface opposite to the first main surface, and an end surface connecting the first main surface and the second main surface, the base material part further has a core material portion that is not porous, the core material portion being disposed consecutively with the porous body portion, the dielectric layer is formed on the end surface in the porous body portion and on an end surface of the core material portion, the dielectric layer includes a first dielectric layer and a second dielectric layer, the first dielectric layer being in contact with the surface of the porous body portion, the second dielectric layer being disposed on the end surface and on the first dielectric layer, and in the porous body portion, a first film thickness of the second dielectric layer in an end surface vicinity region is larger than a second film thickness of the second dielectric layer in a deep inner region, the end surface vicinity region being a region within a predetermined distance from the end surface, the deep inner region being a region located away from the first main surface and at a central portion in a direction parallel to the first main surface.

9. The electrode foil according to claim 8, wherein a third film thickness of the first dielectric layer in a region close to the first main surface is smaller than a fourth film thickness of the first dielectric layer in the deep inner region.

10. The electrode foil according to claim 8, wherein:

in the end surface, a third dielectric layer is disposed between the second dielectric layer and the end surface of the base material part, and a fifth film thickness of the third dielectric layer is smaller than the fourth film thickness of the first dielectric layer in the deep inner region.

11. The electrode foil according to claim 10, wherein:

the end surface includes a first end surface, a second end surface and a third end surface, the second end surface and the third end surface each intersecting with the first end surface, and the third dielectric layer is disposed on each of the first end surface, the second end surface, and the third end surface.

12. An electrolytic capacitor comprising an anode body using the electrode foil according to claim 8.

* * * * *